United States Patent [19]
Bridges et al.

[11] 3,887,253
[45] June 3, 1975

[54] FOOD SERVICE CART

[75] Inventors: John A. Bridges; W. Burk Wyatt, both of Nashville, Tenn.

[73] Assignee: Aladdin Industries, Incorporated, Chicago, Ill.

[22] Filed: Jan. 14, 1974

[21] Appl. No.: 433,069

[52] U.S. Cl. ............................ 312/250; 312/236
[51] Int. Cl. ............................................ A47b 67/02
[58] Field of Search .................. 312/236, 250, 330; 211/126, 176, 49 R, 49 D

[56] References Cited
UNITED STATES PATENTS

| | | | |
|---|---|---|---|
| 3,199,683 | 8/1965 | Graswich | 211/176 |
| 3,275,393 | 9/1966 | Stenz et al. | 312/236 |
| 3,531,169 | 9/1970 | Hoffmann et al. | 312/236 |
| 3,698,782 | 10/1972 | Onori | 312/351 |
| 3,754,640 | 8/1973 | Bridges | 206/4 |

Primary Examiner—Casmir A. Nunberg

[57] ABSTRACT

A food delivery system for use in a hospital or other institution is disclosed. The system comprises a portable cart having compartments for receiving stackable food trays therein. A platform operated by a lever mechanism is provided on the cart for stacking the trays in intimate contact with each other to form a vertical thermal column for retaining heat or cold during transporting of the trays. During loading and unloading the platform is lowered to permit the trays to rest on "L" brackets which are spaced such that each tray is out of contact with every other tray.

11 Claims, 4 Drawing Figures

3,887,253
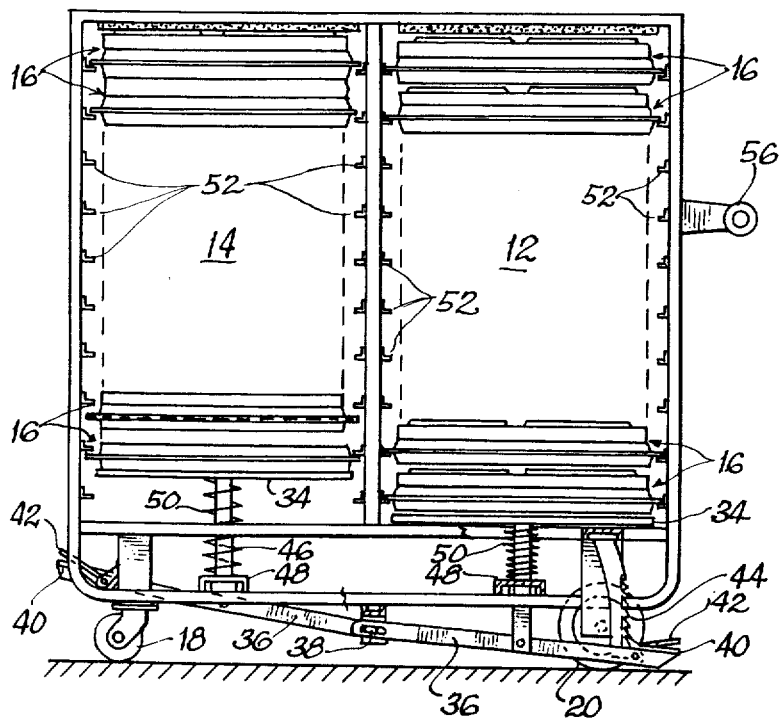
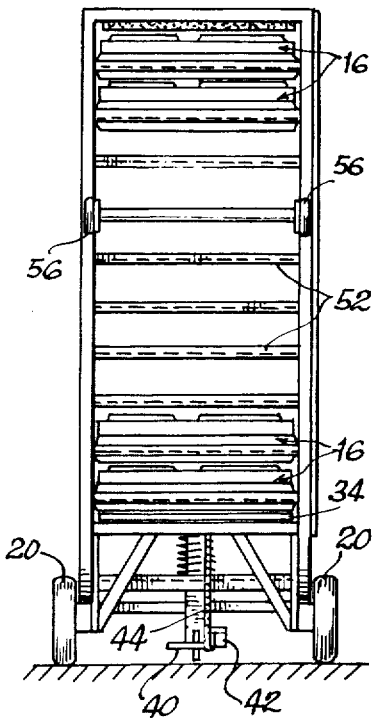
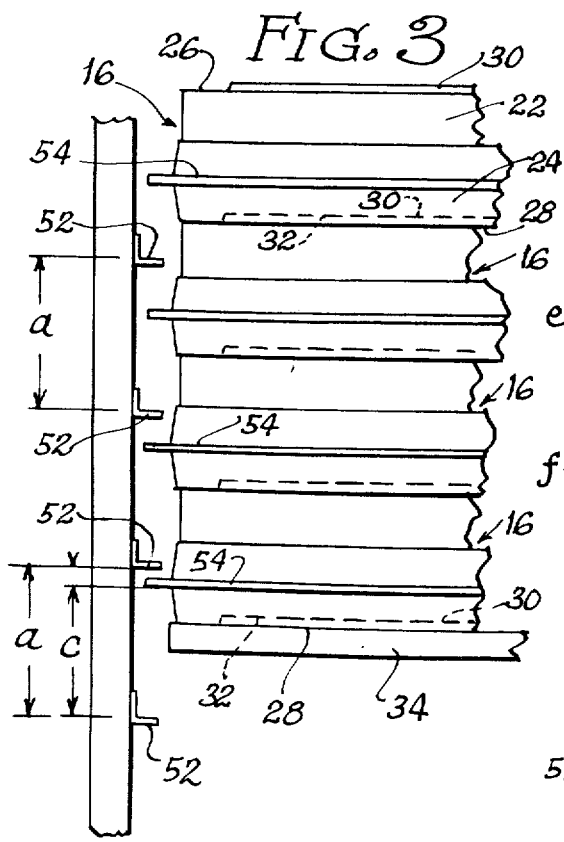
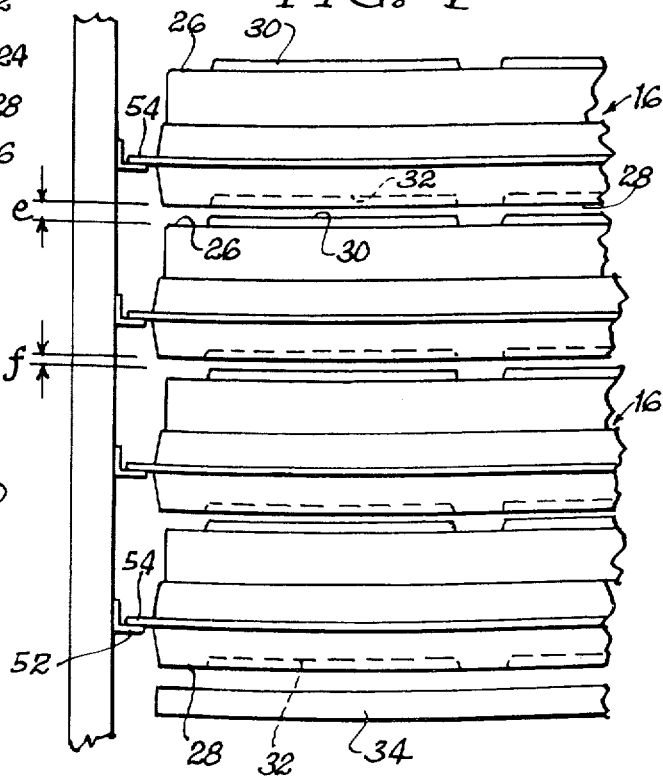

FOOD SERVICE CART

BACKGROUND OF THE INVENTION

This invention relates to devices employed for delivering food to persons residing in an institution, such as a hospital or nursing home. In such an environment it is necessary to bring meals from a central kitchen to patients who may be remotely located.

A particular problem in serving a proper meal to such patients is keeping the food at the proper temperature during transportation. In the past, it has been known to employ food trays of thermally insulated construction. However, where such trays are randomly intermixed, or where such trays are placed on individual shelves of a cart, the temperature change of the food upon serving can still reach undesirable proportions resulting in an unsatisfactory meal. Further, no system is known whereby the trays can be kept in a stacked position for minimum temperature change during transporting and readily unstacked for random removal upon delivery.

It is accordingly an object of the present invention to provide a system capable of delivering foods to persons at a location remote from the preparation point with a minimum of food temperature change.

It is a further object of the present invention to provide a cart which transports food trays stacked one upon the other during transporting and supports them in a spaced apart relationship for easy loading and unloading.

It is another object of the present invention to provide a system which thermally insulates food trays during transporting by stacking the trays to form one or more vertical thermal columns.

Other objects of the present invention will be apparent from the remaining portion of the specification.

SUMMARY OF THE INVENTION

The present invention discloses an institutional food delivery system which employs food trays adapted to be stacked one on top of the other to form a vertical thermal column for purposes of heat sharing. A portable cart having at least one compartment for receiving the trays is provided with means for supporting the trays out of contact with each other, i.e., unstacked, for ease in loading and unloading. The cart is further provided with means for stacking the trays during transporting thereof.

BRIEF DESCRIPTION OF THE DRAWINGS

FIG. 1 is a side view of an embodiment of the food delivery system of the present invention.

FIG. 2 is an end view of the stacking cart according to the present invention.

FIG. 3 is an enlarged partial view of a cart compartment containing stacked trays.

FIG. 4 is an enlarged partial view of a cart compartment containing unstacked trays.

DETAILED DESCRIPTION

Referring to FIG. 1, a food delivery system according to the present invention includes a metal frame 10 of generally rectangular construction. The cart has two compartments 12 and 14 for receiving a plurality of food trays 16 therein and is provided with wheels 18 and 20.

FIGS. 3 and 4 show an enlarged illustration of a type of food tray which may be used with the present invention. Such trays are the subject of U. S. Pat. No. 3,754,640 to which reference is hereby made. Each tray includes a cover portion 22 and a food receiving portion 24. The food receiving portion has one or more compartments formed therein for segregating different kinds of food as, for example, a cold vegetable from a hot entree. The trays are preferably formed of a plastic material having insulating properties to minimize thermal conduction between compartments and to the outside. The trays are, however, thermally conductive along a top 26 of the cover 22 and a bottom 28 of the food receiving portion 24. The top 26 preferably has a plurality of raised surfaces 30 thereon, which surfaces correspond to a plurality of recesses 32 preferably formed in the bottom 28 of the food receiving portion of the tray. When the trays are stacked one on top of the other the raised surfaces of each tray engage the recesses of the tray above it to reduce the possibility of a tray sliding out of the stack and to insure good thermal conduction between trays in the vertical direction. Stacking of the trays thus forms a vertical thermal column for a purpose now to be described.

If foods at the same temperature are placed in the same compartment of all the trays in a stack, the thermal transfer characteristics equivalent to a large volume of food are obtained. For example, if a hot entree is placed in a selected compartment of each tray, a hot thermal column is formed in the vertical direction via the thermally conductive tray tops and bottoms, such that the temperature of all the entrees is maintained substantially constant for a time period greater than would be obtained for an individual tray. Similarly, a cold thermal column will be formed for all of the tray compartments containing a cold vegetable. Thus, when a plurality of trays are properly loaded and stacked, preservation of the food temperature at which each course is prepared can be obtained for a period sufficient to deliver the trays.

The principle involved in utilizing a thermal column is that a large quantity of food at a given temperature will remain at that temperature longer than a smaller quantity of food under otherwise identical conditions. The thermally conductive top and bottom surfaces of the trays permit the formation of these thermal columns which are nearly equivalent, in terms of heat transfer, to a large quantity of food.

Referring again to FIG. 1, the cart 10 is adapted to receive a plurality of trays 16 in each of the two compartments 12 and 14. The cart is provided with means for stacking the trays in engaging relation to each other for transporting and for unstacking or separating the trays for easy loading and unloading. The means for stacking includes a stack supporting means which is preferably a platform 34, positioned beneath the lowermost tray of each stack. It will be apparent, however, that means other than a platform could be employed and the following description is by way of example only. The stacking means also includes means for moving the platform vertically to stack and unstack the trays.

As one sample only, the moving means for each of compartments 12 and 14 may include a lever arm 36 having a slotted opening 37 at one end attached to a fixed member 38 for movement thereabout. The end 40 of the arm 36 is in the form of a foot pedal and is provided with a pawl 42 attached thereto adapted to engage a rachet plate 44 mounted on the cart. Pinned to a mid-portion of the lever arm 36 is a platform support 46, preferably of square cross-section. The support 46 passes upwardly through openings in the cart frame and is connected to the platform 34. A guide member 48 mounted on the cart frame prevents horizontal movement of the platform support. Again, the specific embodiment described may be altered as desired for particular applications.

A coil spring 50 is mounted coaxially of the support 48. It compresses and expands against guide 48 and platform 34. The spring 50 is selected to provide enough force to maintain the platform 34 in the elevated position illustrated in compartment 14 while a full load of stacked trays are supported thereon.

Located along the walls of the cart, arranged in vertically ascending pairs, are a plurality of tray support means which may preferably be L-shaped brackets 52. The L-shaped bracket pairs 52 are disposed within the compartments such that one tray can be supported on each pair, each tray having a flange 54 for this purpose. When the trays are resting on the L-brackets they are separated from each other, as illustrated in FIG. 4, by a distance $e$ between the top of a tray and the bottom of a tray above it and a distance $f$ between the raised surfaces and the bottom of a tray above it. The spacings $e$ and $f$ are such that sufficient clearance exists to load or remove a selected tray without disturbing any other tray. As shown in FIG. 3, when the trays are in their stacked position they do not rest on the L-bracket pairs 52 but are supported solely on platform 34.

The L-brackets are vertically spaced apart within the compartment a distance $a$ such that the lowermost tray will move a distance $c$, where $c$ is less than $a$, when the trays are lifted off the L-brackets for stacking. As will be apparent, each succeeding tray above the lowest tray will be engaged as the stack is formed and will move off its L-brackets a successively smaller distance. Mathematically this distance is $c = e \times$ (number of trays $- 1$). The critical factor is that the lowest tray must engage the tray above it before its flange 54 strikes the L-brackets for the tray above.

OPERATION

When it is desired to use the food delivery system of the present invention, the platform 34 is lowered. Alternatively, if the trays are to be placed into the cart in a stacked arrangement, the platform 34 is maintained in its raised position. To lower the platform the operator steps on the pedal 40 of the lever arm 36. Stepping on the pedal lowers the lever arm and compresses the coil spring 50 thereby lowering the platform 34. The platform is maintained in this position against the bias of the coil spring by engaging the pawl 42 in the rachet plate 44. It is possible, of course, to utilize other means of maintaining the platform in the desired position as, for example, a pin arrangement. When the platform is completely lowered, as illustrated in compartment 12 of FIG. 1, trays are loaded into the compartment and supported on the L-brackets 52.

When a compartment is filled with trays and it is desired to transport the cart to a distribution point, the procedure described is reversed. The operator steps on the pawl 42 to release it from the rachet plate. The coil spring 50 then lifts the platform upwardly to thereby stack the trays. As the platform raises, the trays are lifted off of the L-brackets brackets and come into intimate contact with each other, forming the temperature insulated heat columns previously described. When the trays are completely stacked the pawl is again engaged in the rachet plate to secure the platform in place. The cart is then ready for transporting via a handle member 56 provided on the cart to permit easy steering.

At the food distribution point, the platform is again lowered, causing the trays to again be supported on the L-brackets and out of contact with each other so that any desired tray can be removed without disturbing any other tray in the compartment. The capability of the present system which permits the withdrawal of any tray in a compartment simplifies delivery by eliminating the requirement of arranging the trays in any special sequence corresponding to the delivery route. Further, should there be confusion in regard to a particular meal, an individual tray can be removed and inspected without disturbing the other trays in the compartment. Because the trays are in their unstacked or out of contact position for only a short period of time prior to serving to the patient, a distinct advantage in terms of serving temperature is obtained.

While we have shown and described an embodiment of this invention in some detail, it will be understood that this description and illustration are offered merely by way of example and that the invention is to be limited in scope only by the appended claims.

We claim:

1. An institutional food delivery system for maintaining food temperature constant during transporting comprising:
   food trays capable of nesting one on top of the other to form a stack of trays;
   a portable cart having at least one side loading compartment for receiving said trays therein, and including
   means for nesting said trays in said compartment during transport to a desired location, and
   means for supporting said trays in an unnested condition to permit loading and unloading from the side of said compartment.

2. The food delivery system of claim 1 wherein said food trays are thermally conductive in the vertical direction and include a bottom food receiving portion and a top cover portion, each of said cover portions having raised surfaces thereon for engaging corresponding recesses in the bottom portion of a tray immediately above it in a stack.

3. The delivery system of claim 1 wherein said food trays are thermally insulated along their sides and between compartments formed therein but are thermally conductive along a top and bottom portion of said trays.

4. The food delivery system of claim 3 wherein said trays, when stacked, form at least one thermal column rising vertically through the stack via the conductive top and bottom portions of said trays, each of said columns serving to maintain the temperature of the food in said column substantially constant.

5. A food delivery system according to claim 1 wherein said means for supporting comprises:
   a plurality of L-brackets pairs vertically spaced in said compartment such that each pair supports a tray thereon out of contact with any other tray in the unnested condition.

6. The delivery system of claim 1 wherein said means for stacking includes:
   a platform vertically movable in said compartment;

means for moving said platform between a raised position wherein the trays are nested and supported on said platform, and a lowered position wherein the trays are unnested and supported on said supporting means.

7. The delivery system according to claim 6 wherein said moving means includes:
lever means for moving said platform between said raised and lowered positions;
means for urging said platform toward said raised position;
rachet means securing said lever means in a desired position against the bias of said urging means.

8. The delivery system of claim 5 wherein said means for nesting includes:
a platform vertically movable in said compartment;
means for moving said platform between a raised position wherein the trays are nested and supported on said platform, and a lowered position wherein the trays are unnested and supported on said L-bracket pairs.

9. A portable cart having at least one side loading compartment for receiving trays capable of nesting one on top of the other to form a stack comprising:
means for nesting the trays in said compartment for transport to a desired location; and
means for supporting said trays in an unnested condition to permit loading and unloading from the side of said compartment.

10. A portable cart according to claim 9 wherein said means for supporting comprises:
a plurality of L-brackets pairs vertically spaced in said compartment such that each pair supports a tray thereon out of contact with any other tray in the unnested condition.

11. A portable cart according to claim 9 wherein said means for stacking includes:
a platform vertically movable in said compartment;
means for moving said platform between a raised position wherein the trays are nested and supported on said platform, and a covered position wherein the trays are unnested and supported on said supporting means.

* * * * *